(12) United States Patent
Edelson

(10) Patent No.: US 6,657,334 B1
(45) Date of Patent: Dec. 2, 2003

(54) HIGH PHASE ORDER MOTOR WITH MESH CONNECTED WINDINGS

(75) Inventor: Jonathan Sidney Edelson, North Plains, OR (US)

(73) Assignee: Borealis Technical Limited, Gibraltar ( * ) Notice: Subject to any disclaimer, the term of this patent is extended or adjusted under 35 U.S.C. 154(b) by 64 days.

(21) Appl. No.: 09/713,654

(22) Filed: Nov. 15, 2000

Related U.S. Application Data

(60) Provisional application No. 60/242,622, filed on Oct. 23, 2000.

(51) Int. Cl.⁷ .......................... H02K 7/00; H02K 17/00
(52) U.S. Cl. ...................... 310/68 R; 310/166; 318/254
(58) Field of Search .................... 310/68 R, 72, 310/49 R, 166, 168, 169, 170; 378/254, 805, 501

(56) References Cited

U.S. PATENT DOCUMENTS

| | | | | |
|---|---|---|---|---|
| 6,064,172 A | * | 5/2000 | Kuznetsov | 318/434 |
| 6,153,953 A | * | 11/2000 | Isozaki et al. | 310/112 |
| 6,175,272 B1 | * | 1/2001 | Takita | 330/10 |

* cited by examiner

*Primary Examiner*—Dang Dinh Le

(57) ABSTRACT

A high phase order induction machine drive system is disclosed. This has an inverter system for the synthesis of a plurality of phases of alternating current output, and a N-phase induction motor (N is greater than 3). The motor is connected to the inverter terminals so that each motor phase is electrically connected to a first inverter terminal and a second inverter terminal S+1 inverter terminals distant from the first inverter terminal in order of electrical phase angle (S in the skip number). The phase angle difference between the pair of inverter terminals to which each motor phase is connected is identical for each motor phase.

46 Claims, 3 Drawing Sheets

S=0

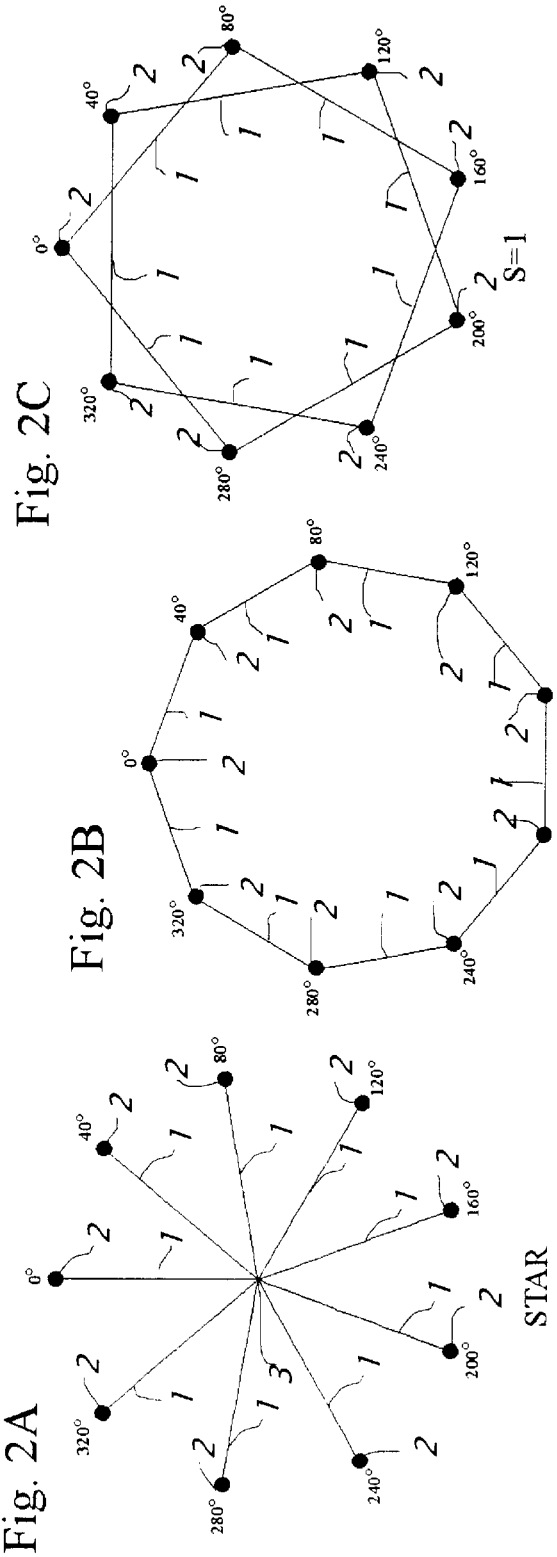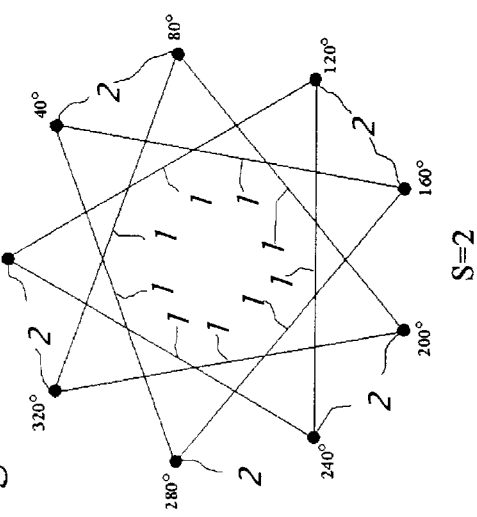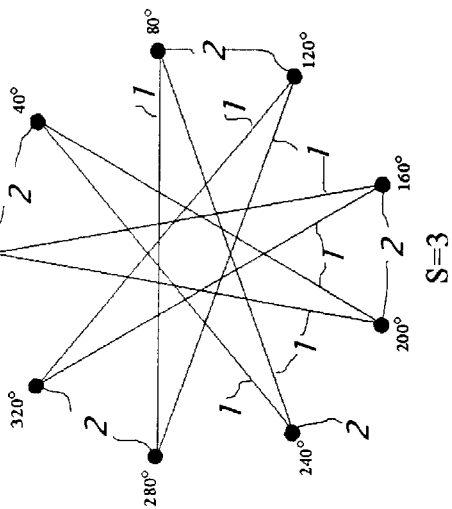

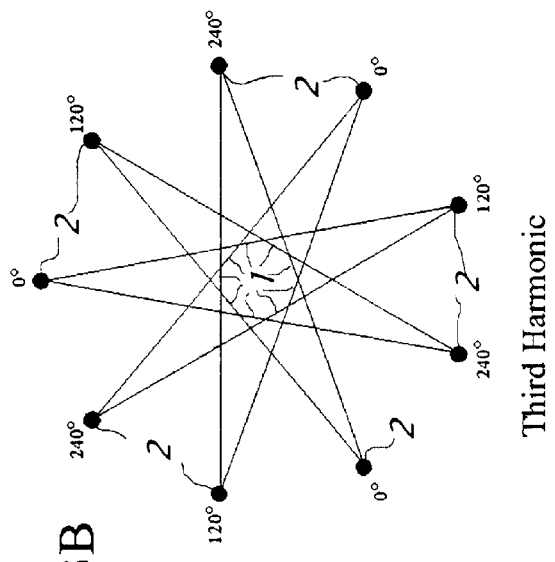
Fig. 3A Fundamental
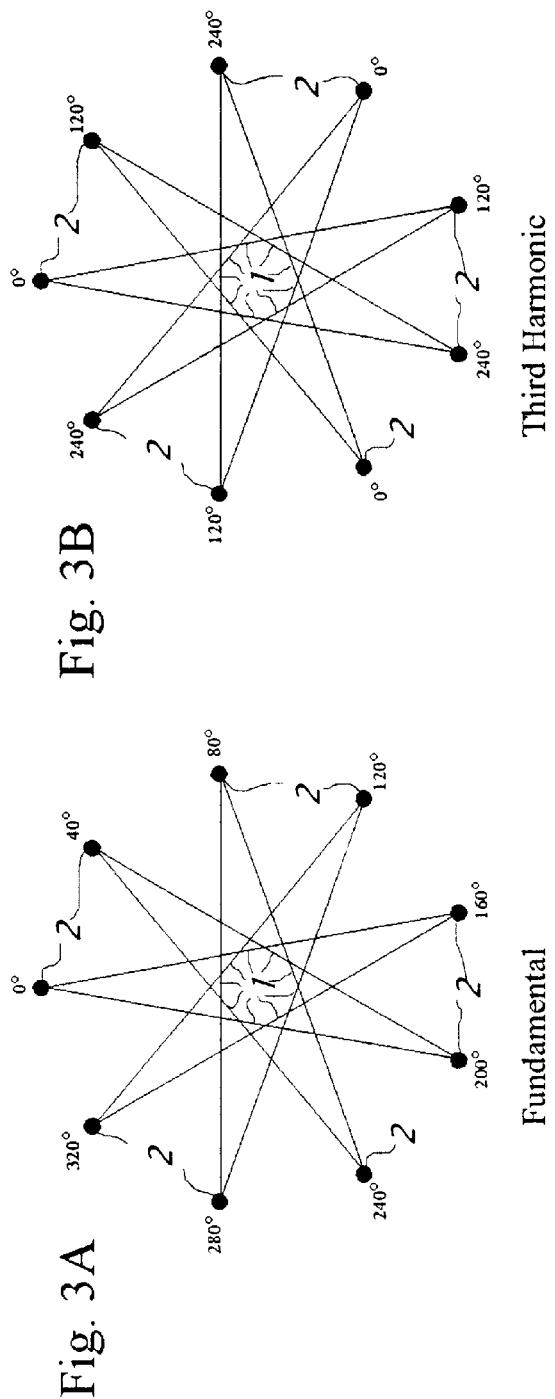
Fig. 3B Third Harmonic
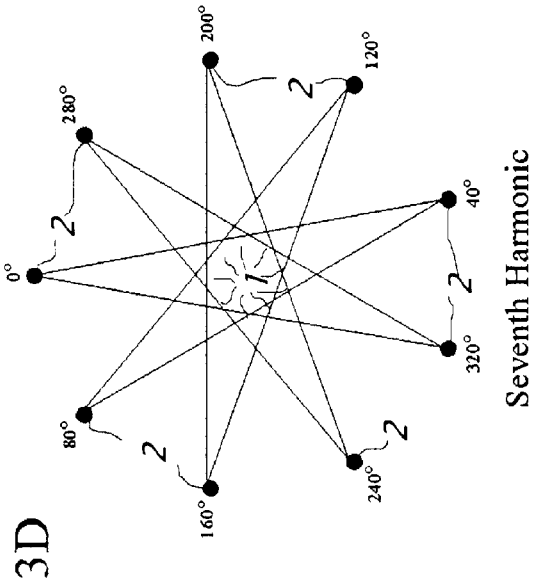
Fig. 3C Fifth Harmonic
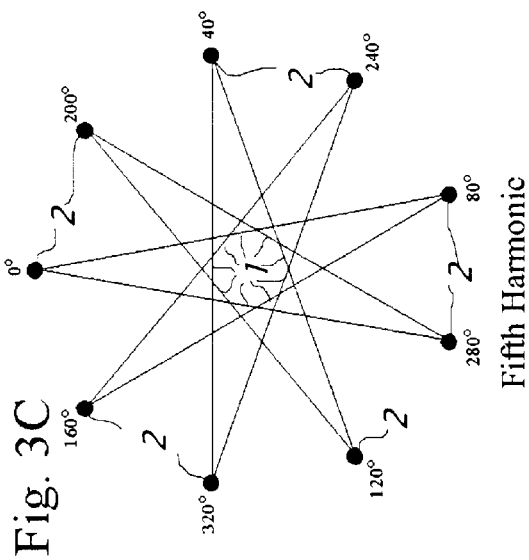
Fig. 3D Seventh Harmonic

HIGH PHASE ORDER MOTOR WITH MESH CONNECTED WINDINGS

This application claims the benefit of a Provisional Application No. 60/242,622 Filed Oct. 23, 2000.

TECHNICAL FIELD OF THE INVENTION

The present invention relates to motors and their inverter drives.

BACKGROUND OF THE INVENTION

An induction motor is commonly driven by an inverter. An inverter is a device capable of supplying alternating current of variable voltage and variable frequency to the induction motor, allowing for control of machine synchronous speed and thus of machine speed. The inverter may also be used with AC induction generators, and can cause an AC induction motor to act as a generator for braking applications.

In many cases, the cost of the inverter is considerably greater than the cost of the motor being supplied. It is thus necessary to minimize the size of the inverter power electronics in order to control system cost.

Whereas the induction machine itself may have substantial overload capability, and may carry currents of the order of five to ten times full rated current for periods measured in minutes, the overload capability of the inverter electronics is severely limited. Exceeding the voltage or current ratings of the inverter electronics will swiftly cause device failure.

Commonly, inverter electronics is specified such that it can tolerate 150% of nominal full load current for 1 minute, and for any given motor, and inverter will be selected which has the same nominal current capability as that of the motor.

Voltage is set internally by the inverter system or by the rectified supply voltage. Voltage overload is normally not specified, and will cause near instantaneous destruction of semiconductor elements. The voltage ratings of the semiconductors instead set the maximum output voltage of the inverter system, and an inverter will be selected which has a maximum output voltage that matches the operating voltage of the motor at full speed.

With any reasonably sized inverter, substantial motor overload capabilities remain untapped.

In many traction application, there is limited available electrical power. Thus requirements for high overload capability can only be met at low speed, where high torque is required for starting, but reduced speed means that mechanical power output is still low. Such low speed torque requirements require high current to flow though the motor, but do not require high operating voltage. It is thus possible to trade high speed operating capability for low speed overload capability at the design stage of a motor drive system.

By increasing the number of series turns in the motor windings, higher slot current may be achieved with the same terminal current, thus permitting the same inverter to provide greater overload current to the motor. This increase in overload capability comes at a substantial cost. The increased number of series turns means that the motor operating voltage is increased, operation at high speed is prevented.

The number of series turns in a motor is thus related to induction machine impedance, or current versus voltage relation. Normally, an induction machine will have a fixed relationship between synchronous speed and impedance, characterized by the Volts/Hertz ratio. For a given inverter and machine frame, a machine wound with a higher Volts/ Hertz ratio will have a lower maximum speed, but higher peak low speed torque.

It is thus necessary to provide for an induction machine drive system in which the induction machine presents a variable Volts/Hertz ratio to the inverter. For high speed operation, the Volts/Hertz ratio would be adjusted to a low value, in order to maintain a suitable induction machine operational voltage. For low speed operation, the Volts/ Hertz ratio would be adjusted to a higher value, so as to permit high overload torque operation.

SUMMARY OF THE INVENTION

From the foregoing it will be appreciated that a serious need exists for a motor drive system that has variable impedance. The present invention provides a drive system that can achieve high torque overload at low speeds whilst also being capable of providing sufficient voltage for high speed applications. In the present invention a high phase order induction machine is used with each phase terminal separately connected to an inverter output. The windings of the induction machine are wound as full span connected windings, and the motor terminals are connected with a mesh connection to produce a low impedance output. The inverter is capable of operating with a variable phase sequence that changes the effective impedance of the motor.

A technical advantage of the present invention is that impedance may be electronically varied.

A further technical advantage is that a motor may achieve substantially high torque at low speeds, whilst also being able to operate at high speeds.

A yet further technical advantage is that an inverter output may be better exploited by a motor.

Further technical advantages will become apparent from a consideration of the figures and the ensuing descriptions.

BRIEF DESCRIPTION OF THE DRAWINGS

For a more complete explanation of the present invention and the technical advantages thereof, reference is now made to the following description and the accompanying drawings, in which:

FIG. 2 illustrates a plurality of ways in which the polyphase inverter may be connected to a polyphase motor.

FIG. 3 illustrates how winding terminals of a motor connected to a polyphase inverter in a particular fashion may be driven by the inverter with various phase angles.

DETAILED DESCRIPTION OF THE INVENTION

Figure 1:
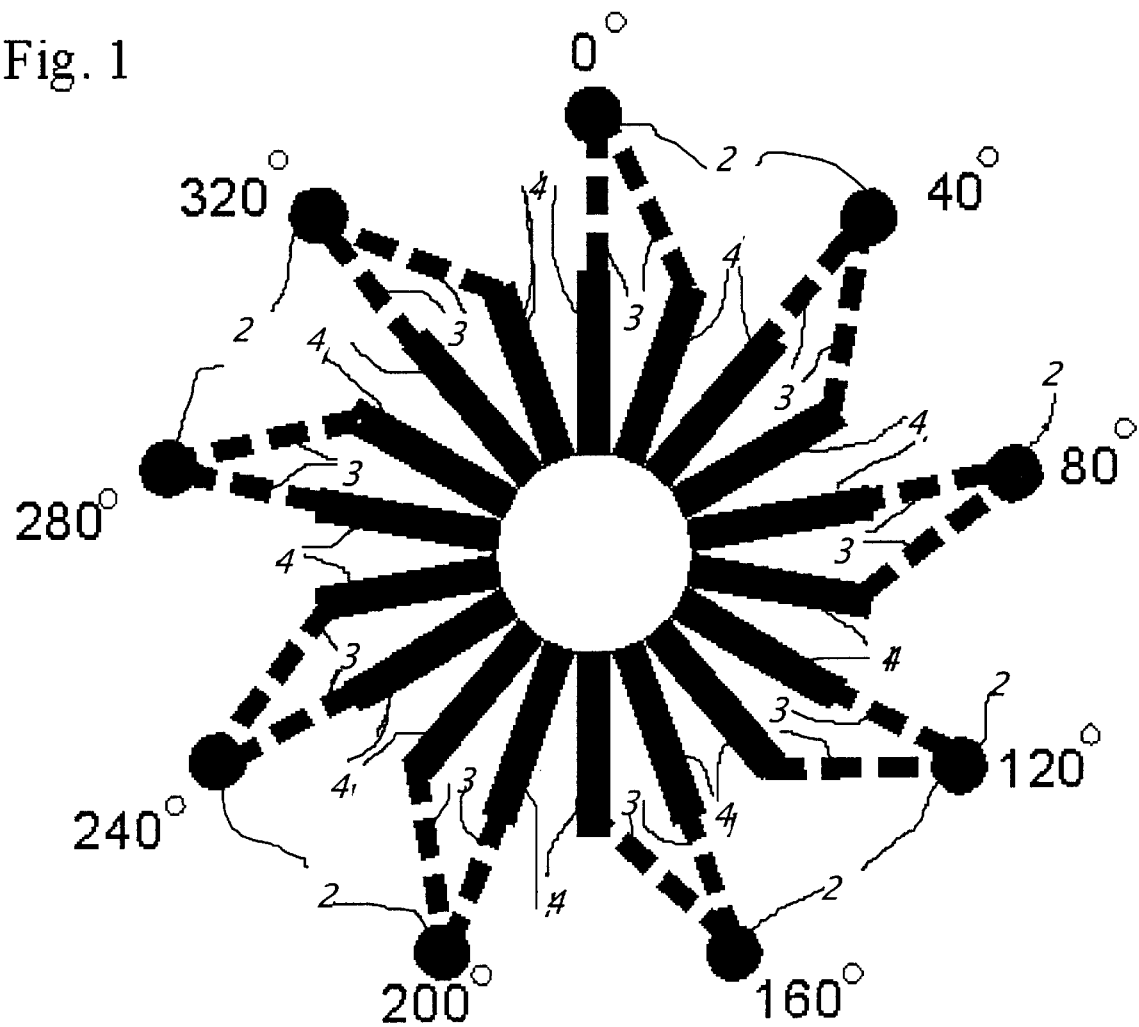
FIG. 1 illustrates how the winding terminals of a polyphase motor may be connected to a polyphase inverter.

In the method and apparatus of the present invention, a high phase order induction motor is connected to a high phase count inverter. Rather than using a star connection for the high phase count machine, the motor is connected mesh, meaning that the two winding terminals of each motor phase are each connected to separate inverter output terminals, whilst each inverter output terminal is connected to two motor phase terminals. The three phase mesh connection is well known in the art, and is commonly known as a delta connection.

In an induction machine, each phase winding set can be described by two terminals. There may be a larger number of terminals, but these are always grouped in series or parallel groups, and the entire set can be characterized by two terminals. In a star connected machine, one of these terminals is driven by the inverter or power supply, while the other terminal is connected to the machine neutral point. All current flows through one terminal, through the neutral point into other windings, and though the driven terminals of the other phases. In a mesh connected machine, these two terminals are connected directly to two different supply points. An example of how this may be done is shown in FIG. 1, in which the stator slots 4 are shown as straight lines running down the inside of the stator, and inverter terminals 2, are shown as circles, alongside which is marked phase angles of each of the inverter terminals. Electrical connections 3 between the winding terminals in stator slots 4 and inverter terminals 2 are represented by dashed lines. Two winding halves are displayed opposite one another, and are actually joined to one another, although this is not shown. The configuration describes a 9 phase machine connected with an S=3 connection—identical to FIG. 2e.

In contrast to three phase systems, in which there are only three inverter terminals and six motor windings terminals, in a high phase count system with N phases, there are N inverter terminals and 2N motor windings terminals. There are thus a substantial number of choices for how an N phase system may be mesh connected. This set of choices is greatly reduced by rotational symmetry requirements, specifically each winding must be connected to two inverter terminals with the same electrical angle difference between them as for every other winding.

A simple graphical schematic of the permissible inverter to motor windings connections may thus be described for a polyphase motor having N phases. In the following embodiment, N is equal to 9, but it is to be understood that this limitation is made to better illustrate the invention; other values for N are also considered to be within the scope of the present invention. FIG. 2a shows 9 evenly spaced terminals 4 and a center terminal 6. Each of the terminals 4 represent one end of a motor winding 1 and the center terminal 6 represents the other end of the motor winding. An inverter 5 has 9 terminals 2, which are connected to one of the terminals 4 of each of the motor windings 1 via electrical connectors 3 as shown.

Permissible connections of the 9 phase windings are either from the center point, to each of the 9 points on the circle (this being the star connection shown as FIG. 2a) or from each of the 9 points to another point S skipped points distant in the clockwise direction, where S represents the number of skipped points (inverter terminals). This latter is shown in FIGS. 2b–a; in FIG. 2b motor winding 1 is represented by a line, and in FIGS. 2c–e inverter 5 and electrical connectors 3 have been omitted for the sake of clarity. It will be noted that for each S from 0 to 3 there is a corresponding S from 4 to 7 that produces a mirror image connection.

FIG. 2 shows all permissible connections for a 9 phase system from S=0 to S=4 as well as the star connection. Noted on the star connection diagram.(FIG. 2a) are the relative phase angles of the inverter phases driving each terminal. For a given inverter output voltage, measured between an output terminal 2 and the neutral point, 6 each of these possible connections will place a different voltage on the connected windings. For the star connection, the voltage across the connected windings is exactly equal to the inverter output voltage. However, for each of the other connections (FIGS. 2b–c), the voltage across a winding is given by the vector difference in voltage of the two inverter output terminals 2 to which the winding 1 is connected then this phase difference is large, then the voltage across the winding will be large, and when this phase difference in small, then the voltage across the winding will be small. It should be noted that the inverter output voltage stays exactly the same in all these cases, just that the voltage difference across a given winding will change with different connection spans. The equation for the voltage across a winding is given by:

$$2*\sin(\text{phasediff})/2)*Vout$$

where phasediff is the phase angle difference of the inverter output terminals driving the winding, and V is the output to neutral voltage of the inverter.

Thus, referring to FIG. 2, when S=0, the phase angle difference is 40 and the voltage across a winding is 0.684 Vout. When S=1 (FIG. 2c), the phase angle difference is 80 degrees, and the voltage across the winding is 1.29 Vout. When S=2 (FIG. 2d), the phase angle difference is 120 degrees, and the voltage across the winding is 1.73 Vout. Finally, when S=3 (FIG. 2e), the phase angle difference is 160 degrees, and the voltage across the winding is 1.97 Vout. For the same inverter output voltage, different connections place different voltage across the windings, and will cause different currents to flow in the windings. The different mesh connections cause the motor to present a different impedance to the inverter.

As disclosed above, in an induction machine, each motor winding set can be described by two terminals. There may be a larger number of terminals, but these are always grouped in series or parallel groups, and the entire set can be characterized by two terminals. Thus whilst FIG. 2 discloses a single motor winding 1 connected to terminals 4 and 6, it is to be understood that this limitation is made to better illustrate the invention; multiple phase windings connected between the terminals are also considered to be within the scope of the present invention.

To deliver the same power to the motor, the same voltage would have to be placed across the windings, and the same current would flow through the windings. However, for the S=0 connection, to place the same voltage across the windings, the inverter output voltage would need to be much greater than with the S=3 connection. If the inverter is operating with a higher output voltage, then to deliver the same output power it will also operate at a lower output current. This means that the S=0 connection is a relatively higher voltage and lower current connection, whereas the S=3 connection is a relatively lower voltage, higher current connection.

The S=0 connection is desirable for low speed operation, where it increases the overload capabilities of the drive, and permits much higher current to flow in the motor windings than flow out of the inverter terminals. The S=3 connection is desirable for high speed operation, and permits a much higher voltage to be placed across the windings than the inverter phase to neutral voltage. This change in connection is quite analogous to the change between star and delta connection for a three phase machine, and may be accomplished with contactor apparatus. However the number of terminals renders the use of contactors to change machine connectivity essentially impracticable.

There is, however, an additional approach available with high phase order inverter driven systems.

The inverter, in addition to being an arbitrary voltage and current source, is also a source of arbitrary phase AC power, and this output phase is electronically adjustable. Any periodic waveform, including an alternating current may be described in terms of amplitude, frequency, and phase; phase is a measure of the displacement in time of a waveform. In a polyphase inverter system, phase is measured as a relative phase displacement between the various outputs, and between any pair of inverter terminals, an electrical phase angle may be determined. In the case of conventional three phase systems, this electrical phase angle is fixed at 120 degrees. However in polyphase systems this phase angle is not fixed. Thus, while the machine terminals 1 . . . 9 may be fixed in their connection to inverter terminals 1 . . . 9, the phase relation of the inverter terminals connected to any given motor winding terminals is not fixed. By changing the inverter phase relation, the impedance that the motor presents to the inverter may be changed. This may be done without contactors.

Fundamental phase relation is both the relative electrical angle of each winding terminal and relative phase relation of the currents driving each winding terminal, such that the stator develops the lowest pole count without discontinuities. In a two pole machine, driving with fundamental phase relation causes the electrical angle f each winding terminal, as well as the phase angle of the currents driving each winding terminal, to be equal to the physical angle of the winding slot associated with that winding terminal. In a four pole machine, the phase angle is equal to double the physical angle of the slot, and in general for an N pole machine the electrical angle between any two slots, and the electrical phase relation of the currents driving those two slots, is equal to N/2 times the physical angle between those two slots.

With reference to FIG. 3, a 9 phase machine is connected to the inverter system using the S=3 mesh. One terminal of each of two windings 1 is connected to each inverter terminal 2. When driven with 'first order' phase differences, then the results are as described above for the S=3 mesh. However, if the phase angles are adjusted by multiplying each absolute phase reference by a factor of three, then the phase differences placed across each winding become the same as those found in the S=2 case, although the topological connectivity is different. If the phase angles are adjusted by a multiplicative factor of five, then the voltages across windings become like those of the S=1 case, and with a multiplicative factor of seven, the voltages become like those of the S=0 case. A multiplicative factor of nine causes all phases to have the same phase angle, and places no voltage difference across the winding.

These changes in phase angle are precisely the changes in phase angle used to change the operating pole count of a high phase order induction machine, as described in others of my patent applications and issued patents.

If a high phase count concentrated winding induction machine is operated by an inverter, but is connected using a mesh connection, then changes in pole count of the machine will be associated with changes in machine effective connectivity. These changes in effective connectivity permit high current overload operation at low speed, while maintaining high speed capability, without the need for contactors or actual machine connection changes.

Of particular value are machines connected such that the fundamental, or lowest pole count, operation is associated with a relative phase angle across any given winding of nearly, but not exactly, 120 degrees. In these cases, altering the output of the inverter by changing the absolute phase angles by a multiplicative factor of three, which may also be described as operation with the third harmonic will result in the relative phase angle across any given winding becoming very small, and causing large winding currents to flow with low inverter currents. A particular example would be a 34 slot, 17 phase machine, wound with full span, concentrated windings, to produce a two pole rotating field. The winding terminations are connected to the inverter using the S=5 mesh. The relative phase angle of the inverter outputs placed across any given winding would be 127 degrees, and the voltage placed across this winding relative to the inverter output voltage is 1.79 times the inverter output voltage. If the machine is then operated with a third harmonic waveform, it will operate as a six pole machine. The relative phase angle across any given winding is now 127*3mod 360=21 degrees, and the voltage placed across the winding relative to the inverter output voltage is 0.37 times the inverter output voltage. Simply by changing the inverter drive angles, the Volts/Hertz relationship of the motor is increased, and inverter limited overload capability is enhanced.

To determine the ideal S, the number of skipped inverter terminals between the winding terminals of each phase of the motor, which would result in the greatest change of impedance when the inverter drives the motor with substantial third harmonic, one would use the formula (N/3)−1, rounded to the nearest integer, for values of N (number of phases in motor) not divisible by 3. When N is divisible by 3, one would use the formula N/3 to determine the skip number.

Other connectivity is certainly possible. The connection described above will tend to maximize machine impedance for the third harmonic, but will actually decrease machine impedance for en fifth harmonic. A connection that most closely approximates full bridge connection, e.g. the S=7 connection for the 17 phase machine described above, will show gradually increasing machine impedance for the $3^{rd}$, $5^{th}$, $7^{th}$, $9^{th}$, $13^{th}$, and $15^{th}$ harmonics This may be of particular benefit, for example, with machines operated with square wave drive. Operation with high pole counts is not generally considered preferable, however it may be of benefit in the particularly desirable case of operating at high overload and low speed. The number of slots is not restricted, nor are the number of phases or poles. In order to determine the value of S (skip number) in the winding to inverter connections, one may use the formula (N−3)/2, when N (number of motor phases) is an odd number. When N is even by may be divided into subsets of odd phase counts, the formula may similarly be used for the odd subsets.

The general principal of the present invention may be utilized for the operation of high phase order induction machines including motors, generators, and motor/generators, and may also be utilized for different loads which require variable frequency supply, e.g. induction heating applications. Also, saturation of single harmonics are not required, and an exceedingly variable impedance may be produced by the gradual and increasing superimposition of harmonic content, for example, of the third harmonic.

The present invention has been described with regard to rotary induction motors, however it may be implemented with linear induction motors too, using similar techniques for changing winding impedance. Where the windings of a linear or also of a rotary induction motor comprise single inductors instead of coils, then inverter output phase angle may be altered by an even multiplicative factor in order to effect impedance changes. In some cases, the inverter may even multiply each phase angle by a fractional factor to vary the impedance of the motor.

The present invention has been described as a way of connecting a polyphase motor to a polyphase inverter.

Furthermore, there have been described methods of electrically varying the impedance, and methods to design the windings to inverter connections in order to optimize such impedance variation. In this way, the same motor may act as though it has a high number of series turns for low speed operation, being supplied with high voltage and low current, yet still be able to reach high speeds as though the motor has relatively few series turns. However, an additional facet of the present invention provides for a plurality of inverter to windings connections to be set up in the same machine. Arrangements can include series turns able to instead be connected in parallel (with suitable switches etc), which mechanical variation to result in a mechanical change of impedance e.g. in 9 phase machine, S=0 and S=3 could both be independently connected or available to be connected. Contactors or switches would be arranged in each terminal to change the way the windings are connected to the inverter terminals based on the dual arrangements set up in the machine. This is an example of another way in which the motor impedance may be controlled according to the present invention.

The word "terminal" has been used in this specification to include any electrically connected points in the system—this may be a screw, for example, or any electrical equivalent, for example, it may simply comprise a wire connecting two components in a circuit.

In a similar sense, inverter output elements are commonly half bridges, but they may alternatively comprise other switching elements. One embodiment of the present specification has described two winding terminals connected to a single inverter terminal. The single inverter terminal referred to is intended to also include electrical equivalents, such as a device made of two inverter terminals that are electrically connected together.

Thus, it is apparent that there has been provided, in accordance with the present invention, a method and apparatus for a high phase order motor with mesh connected windings that satisfies the advantages set forth above. Thus, the mesh connection and the implementation techniques of the present invention may be used in virtually all motor applications.

While this invention has been described with reference to numerous embodiments, it is to be understood that this description is not intended to be construed in a limiting sense. Various modifications and combinations of the illustrative embodiments will be apparent to persons skilled in the art upon reference to this description. It is to be further understood, therefore, that numerous changes in the details of the embodiments of the present invention and additional embodiments of the present invention will be apparent to, and may be made by, persons of ordinary skill in the art having reference to this description. It is contemplated that all such changes and additional embodiments are within the spirit and true scope of the invention as claimed below.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

I claim:

1. A high phase order induction machine drive system, comprising
   a) an inverter system for the synthesis of a plurality of phases of alternating current output, each phase electrically connected to at least one inverter terminal, and
   b) an induction motor comprising N phases, where N is greater than 3, connected mesh to said inverter terminals, said mesh characterized in that:
      each motor phase is electrically connected to:
         (i) a first inverter terminal, and
         (ii) a second inverter terminal S skipped terminals distant from said first inverter terminal in order of electrical phase angle, where S is the skip number and represents the number of skipped terminals;
      and the phase angle difference between the two inverter terminals to which each motor phase is connected is identical for each motor phase.

2. The high phase order induction machine drive system of claim 1 wherein said phase angle difference is approximately 120 electrical degrees.

3. The high phase order induction machine drive system of claim 1 wherein N is a multiple of 3, and S=N/3.

4. The high phase order induction machine drive system of claim 1 wherein said alternating current output is selectable between a fundamental frequency component and a fundamental frequency component multiplied by three.

5. The high phase order induction machine drive system of claim 1 wherein said alternating current output comprises a variable proportion of a fundamental frequency component and a third harmonic frequency component.

6. The high phase order induction machine drive system of claim 1 wherein N=17 wherein S=5.

7. The high phase order induction machine drive system of claim 1 wherein said inverter output comprises a variable degree of a third harmonic component superimposed upon the fundamental frequency component.

8. The high phase order induction machine drive system of claim 1 wherein S=(N−3)/2, and wherein said alternating current output is variable between: an increase in the phase angle difference in response to a signal to increase the impedance of the motor, a decrease in the electrical phase difference as a response to a signal to decrease the impedance of the motor, and a minimum phase angle difference corresponding to the fundamental frequency.

9. The high phase order induction machine drive system of claim 1 wherein S=0, and wherein said alternating current output is variable between: an increase in the phase angle difference in response to a signal to decrease the impedance of the motor, a decrease in the phase angle difference as a response to a signal to increase the impedance of the motor, and a minimum phase angle difference corresponding to the fundamental frequency.

10. The high phase order induction machine drive system of claim 1 wherein N is odd.

11. The high phase order induction machine drive system of claim 10 wherein S=(N−3)/2.

12. The high phase order induction machine drive system of claim wherein N is any even number greater than 4 and wherein said mesh connection comprises a plurality of mesh subsets wherein each subset comprises an odd number of phases.

13. The high phase order induction machine drive system of claim 12 each of said subsets having a skip number of N/3, if N is a factor of 3; and (N/3)−1, rounded to the nearest integer, if N is not a factor of 3.

14. The high phase order induction machine drive system of claim 13 wherein said alternating current output comprises a variable proportion of a fundamental frequency component and a third harmonic frequency component.

15. The high phase order induction machine drive system of claim 12 wherein said subsets having a skip number of (N−3)/2.

16. The high phase order induction machine drive system of claim 12 wherein said alternating current output comprises harmonic frequency components.

17. The high phase order induction machine drive system of claim 12 wherein said alternating current output comprises harmonic components superimposed upon a fundamental frequency component.

18. The high phase order induction machine drive system of claim 17 wherein said harmonic comprise only odd order harmonics.

19. The high phase order induction machine drive system of claim 12 wherein each of said subsets having a skip number of N/3, if N is a factor of 3; and (N/3)−1, rounded to the nearest integer, if N is not a factor of 3.

20. The high phase order induction machine drive system of claim 12 wherein said inverter output comprises a harmonic frequency component.

21. The high phase order induction machine drive system of claim 20 wherein said harmonic frequency component is an odd harmonic.

22. The high phase order induction machine drive system of claim 20 wherein said harmonic frequency component is third harmonic.

23. The high phase order induction machine drive system of claim 1 wherein said alternating current output comprises a fundamental frequency component and a harmonic frequency component.

24. The high phase order induction machine drive system of claim 23 wherein said harmonic frequency is an odd harmonic frequency.

25. The high phase order induction machine drive system of claim 23 wherein said harmonic frequency is third harmonic frequency.

26. The high phase order induction machine drive system of claim 12 wherein said alternating current output is variable between: substantially fundamental frequency output, substantially harmonic frequency output, and a combination of fundamental frequency output with superimposed harmonic frequency output.

27. The high phase order induction machine drive system of claim 1 wherein said alternating current output comprises a square wave component.

28. The high phase order induction machine drive system of claim 1 wherein S=0.

29. The high phase order induction machine drive system of claim 1 wherein N≧9.

30. The high phase order induction machine drive system of claim 1 wherein said motor having 18 phases divided into two subsets of nine phases, wherein each subset having a separate mesh connection with a skip number of 3 within that subset.

31. The high phase order induction machine drive system of claim 1 wherein said motor is a linear induction motor.

32. The high phase order induction machine drive system of claim 1, wherein said motor phases comprise a single inductor per slot.

33. The high phase order induction machine drive system of claim 1 wherein N is not a multiple of 3, and wherein S=(N/3)−1 rounded to the nearest integer.

34. The high phase order induction machine drive system of claim 1 wherein said inverter output comprises a harmonic frequency component.

35. The high phase order induction machine drive system of claim 34 wherein said harmonic frequency component is an odd harmonic.

36. The high phase order induction machine drive system of claim 34 wherein said harmonic frequency component is third harmonic.

37. The high phase order induction machine drive system of claim 34 wherein said alternating current output comprises a fundamental frequency component and a harmonic frequency component.

38. The high phase order induction machine drive system of claim 37 wherein said harmonic frequency is an odd harmonic frequency.

39. The high phase order induction machine drive system of claim 37 wherein said harmonic frequency is third harmonic frequency.

40. The high phase order induction machine drive system of claim 1 wherein said alternating current output is variable between: substantially fundamental frequency output, substantially harmonic frequency output, and a combination of fundamental frequency output with superimposed harmonic frequency output.

41. The high phase order induction machine drive system of claim 1 wherein said inverter system is further able to multiply the phase angle difference by a multiplicative factor in response to a signal to increase the impedance of the motor.

42. The high phase order induction machine drive system of claim 1 wherein said inverter system is able to increase the phase angle difference in response to a signal to increase the impedance of the motor.

43. A high phase order induction motor having more than three phases, connected to inverter output elements with a mesh connection, said mesh characterized in that: each motor phase is electrically connected to a first inverter terminal and a second inverter terminal S skipped inverter terminals distant from the first inverter terminal in order of electrical phase angle, where S is the skip number, and the phase angle difference between the pair of inverter terminals to which each motor phase is connected is identical for each motor phase.

44. The high phase order induction machine of claim 43 wherein N is the number of phases of the motor, and wherein N is odd and wherein S=(N−3)/2.

45. The high phase order induction motor of claim 43 wherein S=0.

46. The high phase order induction motor of claim 43 wherein N is the number of phases of the motor, and wherein S=(N/3)−1, rounded to the nearest integer.

* * * * *